United States Patent [19]

Fite et al.

[11] 4,151,414

[45] Apr. 24, 1979

[54] METHOD AND APPARATUS FOR DETECTION OF EXTREMELY SMALL PARTICULATE MATTER AND VAPORS

[75] Inventors: Wade L. Fite; Richard L. Myers, both of Pittsburgh, Pa.

[73] Assignee: Extranuclear Laboratories, Inc., Pittsburgh, Pa.

[21] Appl. No.: 783,323

[22] Filed: Mar. 31, 1977

Related U.S. Application Data

[63] Continuation-in-part of Ser. No. 711,231, Aug. 3, 1976, Pat. No. 4,093,855, which is a continuation of Ser. No. 465,136, Apr. 29, 1974, Pat. No. 3,973,121, which is a continuation-in-part of Ser. No. 319,442, Dec. 29, 1972, Pat. No. 3,808,433.

[51] Int. Cl.[2] ........................ H01J 39/34; B01D 59/44

[52] U.S. Cl. .................................... 250/281; 250/282; 250/292

[58] Field of Search ............... 250/251, 282, 281, 292, 250/423, 425, 398, 399; 313/15, 399, 230

[56] References Cited

U.S. PATENT DOCUMENTS

| | | | |
|---|---|---|---|
| 3,258,713 | 6/1966 | George | 250/251 |
| 3,641,340 | 2/1972 | Grinten et al. | 250/292 |
| 3,808,433 | 4/1974 | Fite et al. | 250/251 |
| 3,835,319 | 9/1974 | Roehrig et al. | 250/292 |
| 3,973,121 | 8/1976 | Fite et al. | 250/292 |

*Primary Examiner*—Alfred E. Smith
*Assistant Examiner*—B. C. Anderson
*Attorney, Agent, or Firm*—Penrose Lucas Albright; William B. Mason

[57] ABSTRACT

The measurement of a dc current from ions produced in a surface ionization detector for particulates in combination with simultaneous particulate counting to differentiate between particulates above or below a predetermined size and total particulates present thus determining whether a given aerosol consists primarily of large particulates or very small particulates and providing general information about the particle size in an aerosol. The dc current measurement further provides surface ionization detection of particulates at densities which overload circuitry for pulse counting, whereby the dynamic range of the instrument is extended.

19 Claims, 6 Drawing Figures

NIGHTTIME OUTDOOR AIR SAMPLING AT RIDC PARK, O'HARA TOWNSHIP, ALLEGHENY COUNTY, PENNSYLVANIA, DURING AN EARLY FEBRUARY MORNING

METHOD AND APPARATUS FOR DETECTION OF EXTREMELY SMALL PARTICULATE MATTER AND VAPORS

RELATED PATENTS AND PATENT APPLICATIONS

This is a continuation-in-part of application Ser. No. 711,231 filed Aug. 3, 1976, now U.S. Pat. No. 4,093,855 on June 6, 1978, which is a continuation of application Ser. No. 465,136 filed Apr. 29, 1974, now U.S. Pat. No. 3,973,121, which is a continuation-in-part of application Ser. No. 319,442 filed Dec. 29, 1972, which issued as U.S. Pat. No. 3,808,433 on Apr. 30, 1974.

BACKGROUND OF THE INVENTION

This invention relates to the detection by surface ionization of particulate matter and more particularly to such detection in an instrument which combines dc current measurement with counting of particulates having distinguishing characteristics such as size.

U.S. Pat. Nos. 3,808,433 and 3,973,121 disclose apparatus for detection of very small particulate matter and macromolecules of a type which is referred to hereinafter as a surface ionization monitor for particulates.

A particulate introduced into a chamber strikes a heated surface located within the chamber and decomposes, giving to the surface its various constituents and impurities. Those constituents and impurities having ionization potentials (or electron affinities) comparable to the work function of the hot surface become surface ionized and a burst of positive or negative ions is evolved from the surface. Detection of the electrical charge of such ions registers the arrival of the particulate at the hot surface.

U.S. Pat. No. 3,808,433 is addressed primarily to the pulse counting circuitry for the detection of the individual bursts of ions and the manner in which the electrical pulse heights are related to the size of each individual particulate detected. However, with a large number of countable particulates, the instrument can become overloaded. Thus, a need exists of extend the dynamic range of surface ionization monitors for particulates to handle count rates in excess of what might be sufficient to overload pulse counting circuitry. Additionally, the simultaneous use of pulse counting of particulates with measurement of the total dc ion current, in ranges where particulate concentration do not overload the counting circuitry, permits obtaining of information about general particle size in an aerosol.

SUMMARY OF THE INVENTION

The instant invention is directed to the simultaneous registering of particle count rate and total dc ion current in a surface ionization monitor for particulates. It meets the problem of an overload in the pulse count rate by registering the charge carried by many pulses in sequence and measuring the total dc ion current produced. If the pulses produced are too small to be distinguished above the electrical circuit noise, the dc ion current still registers, thus indicating that the aerosol is composed of only very small particulates or vapors or both. By adjusting the pulse height discriminator in the pulse counting circuitry to a predetermined value, the presence of a dc current and the absence of pulsed signals indicates that the particulate size in the aerosol is less than that associated with the predetermined pulse discriminator level which has been set. Finally, a low count rate combined with a high dc ion current indicates the presence of an aerosol having large particulate sizes, particularly where the count rate is relatively independent of the pulse height discriminator level when set at low level values.

Other adaptations and capabilities of the invention will be appreciated by those skilled in the art from the following description with reference to the accompanying drawings, in which:

DESCRIPTION OF THE PREFERRED EMBODIMENTS

Figure 1:
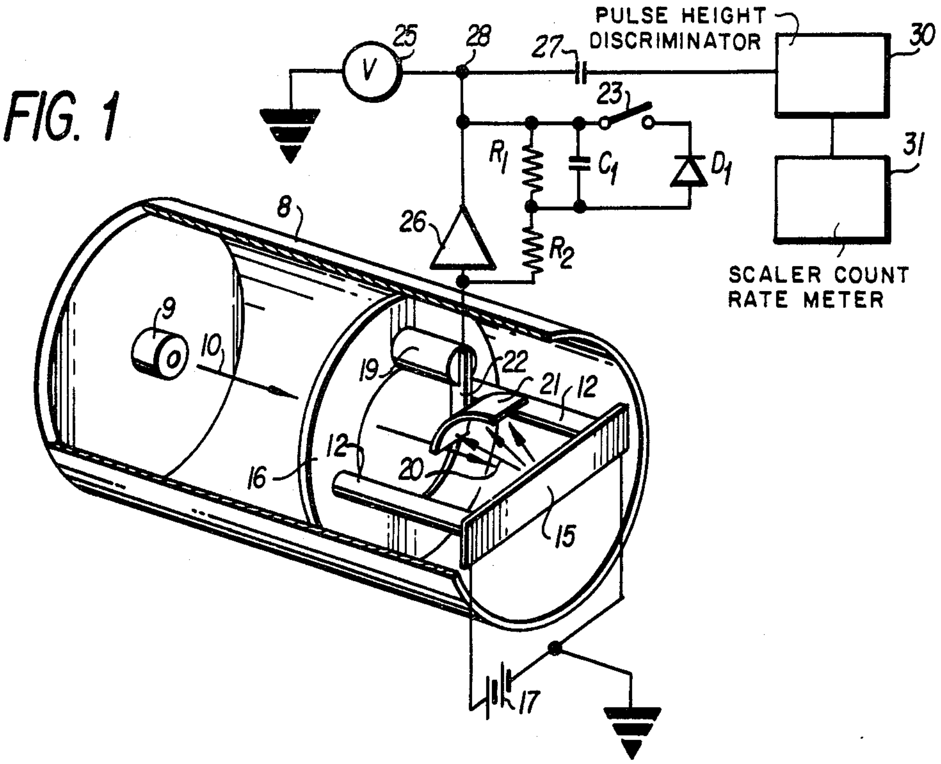
FIG. 1 is a diagrammatic isometric representation of an embodiment of the invention is partial section wherein the particulates strike a hot surface to generate bursts of fragment ions directly collected by an electrode to produce discrete and continuous measureable signals.

FIG. 1 depicts a preferred embodiment of the invention. The detector devices are located within a chamber 8 which is continuously evacuated by a suitable vacuum producing mechanism (not shown) to an operating pressure of slightly less that atmospheric pressure to the high vacuum region (better than $10^{-4}$), as desired.

Particulate matter 10 is received in the container 8 through a small orifice 9 and passed in a stream to strike a surface 15 shown in the form of ribbon which is mounted on electrically insulating supports 12 and is heated by passage therethrough of an electrical current provided by a voltage source 17. As a result of the particulates 10 impinging upon the surface 15, fragment ions 20 are produced which are emitted from the hot surface 15 and drawn to a receiving electrode 21 which is mounted on an insulated support 19 via a metal rod 22 adequate to provide the necessary mechanical strength and rigidity.

The pulses of ions arriving at the electrode 21 produce pulses of currents which pass to a high gain amplifier 26 which in its feedback loop has in parallel a resistor $R_1$ and condensor $C_1$ which are connected in series to a resistor $R_2$. The $R_1$ $C_1$ circuit integrates many individual pulses and produces a dc voltage offset at point 28 which is measured by a voltmeter 25. Superimposed on this dc voltage is a voltage generated by the voltage drop over the resistor $R_2$ which closely follows the rapidly changing current curves by the individual ion pulses. This rapidly varying voltage pulse is transmitted through the condensor 27 to further stages of pulse amplification, pulse height discriminator 30 and a scaler count rate meter 31 or other appropriate known types of registering devices to record the arrival of particle 10 thus providing the desired pulse count information.

By placing a diode $D_1$ in parallel with $R_1$ and $C_1$ by closing switch 23, the dc output becomes linear with the ion current at low ion currents. However, as the ion current increases, the response becomes logarithmic, followed again by a linear response, dependent on the value of $R_2$.

Figure 3:
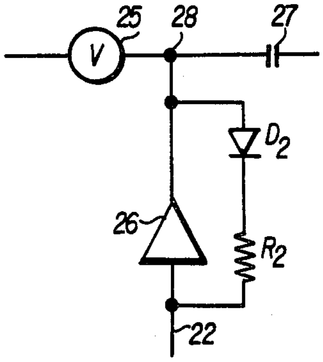
FIG. 3 is a circuit diagram disclosing circuitry which may be substituted for that shown in FIGS. 1 and 1A.

As shown in FIG. 3, by providing a diode $D_2$ instead of resistor $R_1$ and condensor $C_2$, the direct current output is a logarithm of the total direct total output which is a desirable feature for measuring total currents when changes of many orders of magnitude occur.

Figure 1A:
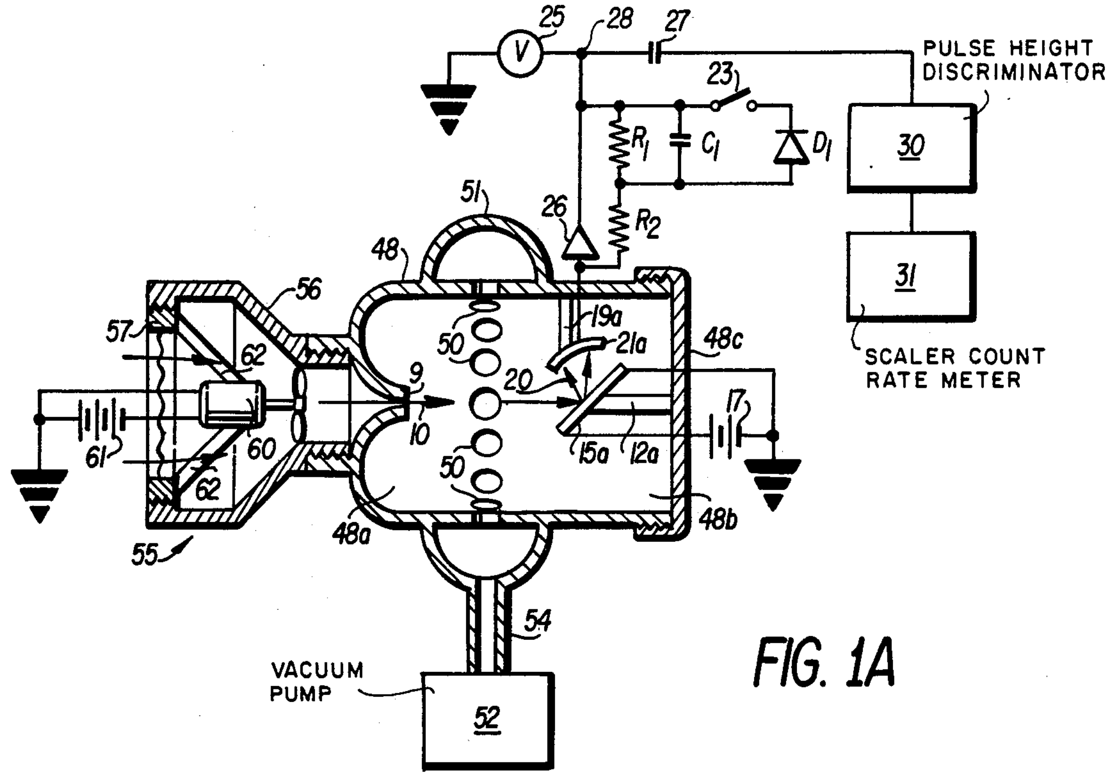
FIG. 1A is a diagrammatic side view sectional representation of an embodiment similar to FIG. 1 which illustrates the addition of a fan and/or a vacuum pump.

FIG. 1A is a diagrammatic side view of a detector similar to that shown in FIG. 1 with the same reference numerals applied to identical components. Chamber 48 is similar to chamber 8 of FIG. 1 and includes on one side a small orifice 9 for admitting particulate matter 10. It will be noted that chamber 48 includes a plurality of openings 50 which connect into a circular conduit 51 that, in turn, leads to a vacuum pump 52 via a passage tube 54. Also, a blower mechanism 55 which includes a casing 56 may be removably secured to chamber 48 to surround the inlet of orifice 9. This mechanism includes a screen 57 which is removably connected to the entrance of casing 56 and has attached thereto a fan 60 energized by a voltage source 61. Fan 60 is supported from the frame portion of screen 57 through a plurality of struts 62. The function of the fan 60 is to displace air from the outside into chamber 48. Screen 57 prevents debris such as leaves, twigs and the like and also insects from entering or clogging orifice 9. Normally, vacuum pump 52 and blower mechanism 55 are not utilized in the same operation. With blower mechanism 55, chamber 48 operates at substantially atmospheric pressure whereas vacuum pump 52 is capable of reducing the pressure within chamber 48 to a high vacuum as desired. A heated surface **15*a* is supported by a rod 12*a* composed of electrically insulating material and it is heated by a voltage source 17 via a connecting electrical circuit as shown in FIG. 1. Particulate matter impacting on heated surface 15*a* causes the emission of a burst of ions which are received by electrode 21*a* and the resulting electrical pulse is recorded as noted previously. Electrode 21*a* is supported by an electrical insulated support 19*a* affixed to the outer wall of chamber 48. A cap 48*c*, to which support 12*a* is affixed, provides means for gaining access to the interior of chamber 48 for the repair or replacement of parts or the like. A similar closure may be included in chamber 8**.

The apparatus illustrated in FIG. 1A operates in essentially the same manner as the FIG. 1 detector. The primary distinction is, with use of blower mechanism 55, the apparatus operates at atmospheric pressure within chamber 48 without the necessity of employing a vacuum pump 52.

Figure 2:
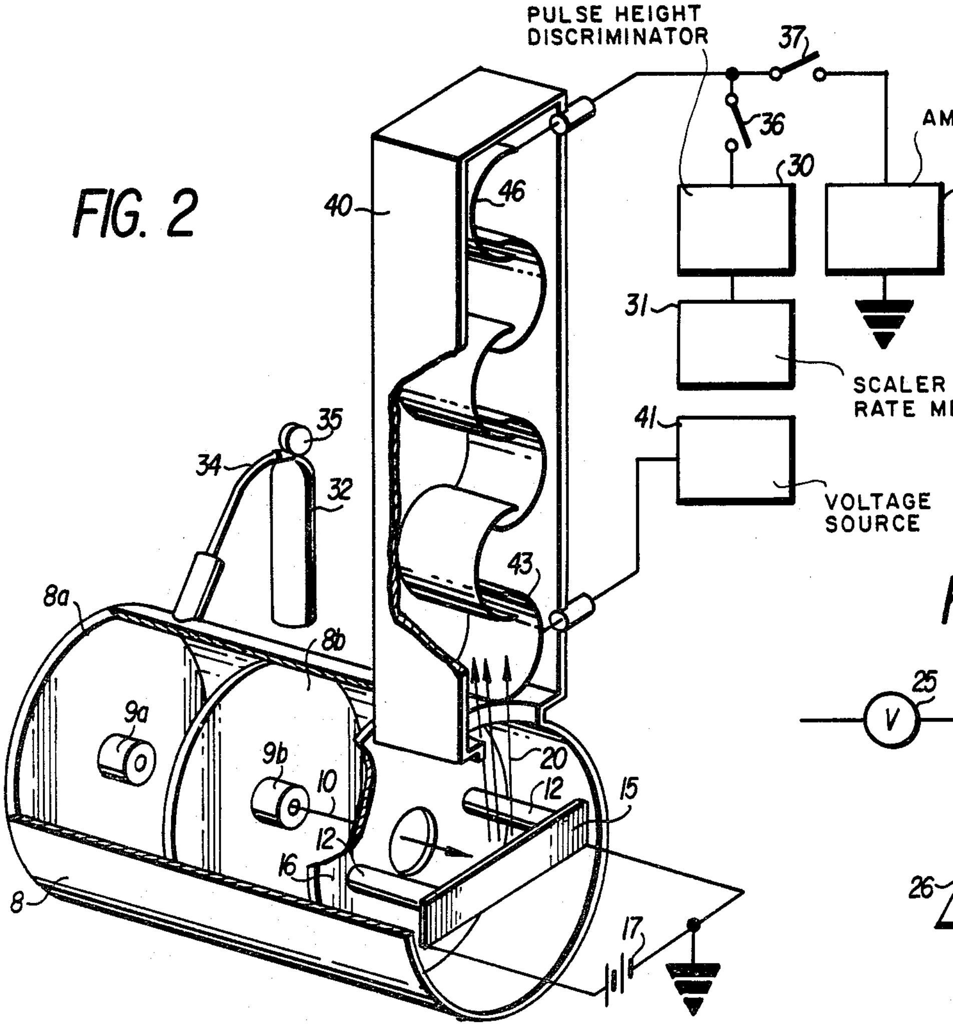
FIG. 2 is a representation similar to FIG. 1 of an embodiment including a electron multiplier to collect the bursts of fragment ions and means to dilute the air sample.

FIG. 2 illustrates an arrangement somewhat similar to FIG. 1 except that the container 8 is provided with two chambers **8*a* and 8*b*, each of which has an orifice 9*a* and 9*b* respectively. Vacuum producing means is connected to the chamber 8*b* to produce a high vacuum region within chamber 8 (better than $10^{-4}$ mm of mercury). A clean gas source 32 is connected via a conduit 34 including a metering valve 35 to the chamber 8*a* of container 8**. The purpose of this gas is to dilute the gas containing the aerosol in situations where the count rate is too great.

In the apparatus shown in FIG. 2, to increase the intensity of the electrical pulse signals, the fragment ions 20 are drawn to a first dynode 43 of an electron multiplier structure 40 by an appropriate potential placed on the first dynode by a voltage source 41. The electrons collected at the output of the electron multiplier 40 with switch 36 closed and switch 37 open appear as a pulse of electrons and are then as previously described passed through a pulse height discriminator 30 to a count rate meter 31 or other appropriate device to register the arrival of the particulates 10. However, with the switch 36 open and switch 37 closed, pulses of ions which arrive from the electron multiplier 40 pass through an ammeter or other current measuring device 44 to ground or other circuit common. The inertia of the meter integrates many pulses over time and thus reads out a dc current. Such a current measuring device may be an electron ammeter with stages of gain in it. With both switches 36 and 37 closed, the simultaneous measure of pulses and current is provided.

Figure 2A:
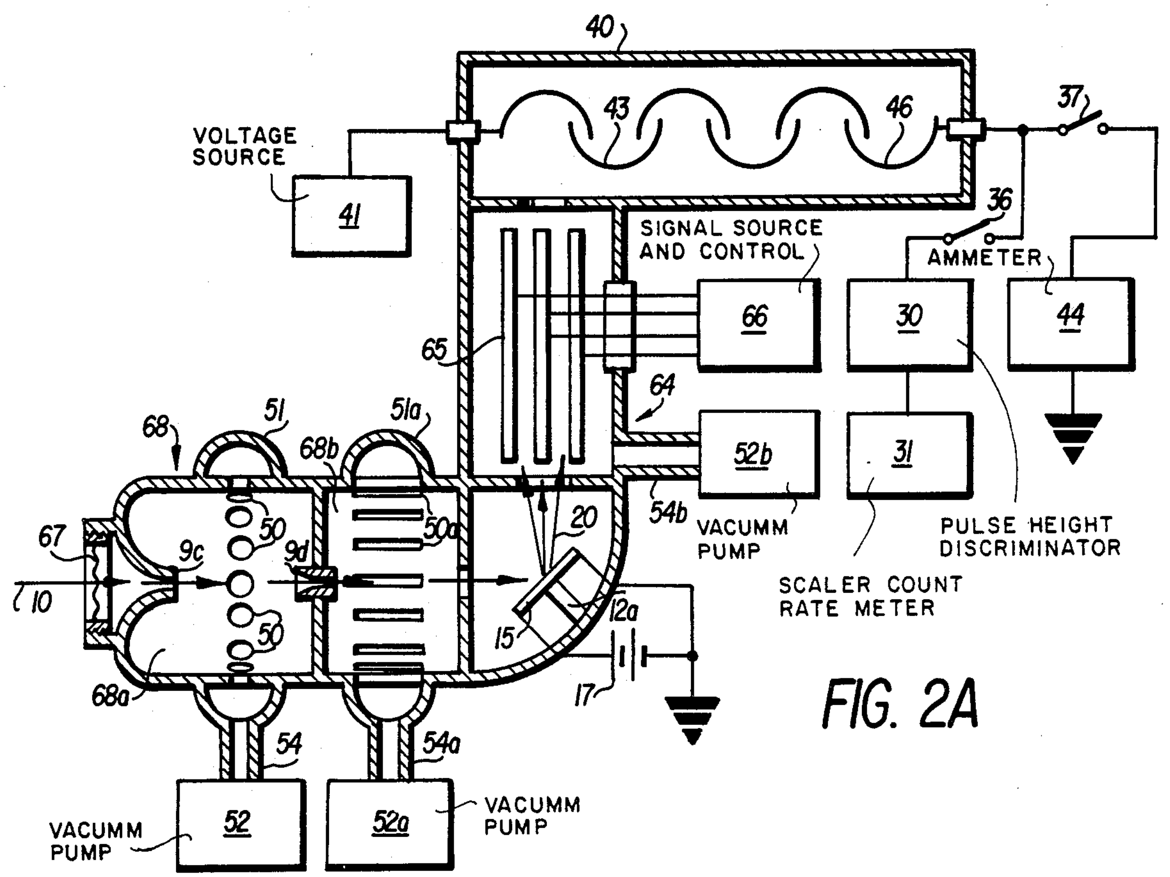
FIG. 2A is a diagrammatic side view sectional representation of an embodiment similar to that shown in FIG. 2 which includes, in addition, a charge to mass analyzer between the hot surface and the electron multiplier.

An embodiment similar to FIG. 2 is illustrated in FIG. 2A. This embodiment has, however, a charge-to-mass analyzer 64 provided for separating the fragment ions 20 after leaving surface 15 and before receipt at the electron multiplier 40. Preferably this charge-to-mass analyzer is a quadrupole mass filter. Alternatively, however, other known devices utilized for the purpose of mass spectrometry may be substituted. Its purpose is to determine and analyze the signals produced from specific fragment ions 20. By this means, constituents and nature of particulate matter 10 may be revealed. Analyzer 64 includes the quadrupoles 65 electrically connected to a signal source and control 66 which determines the charge-to-mass filtration ratio and includes a scan mechansim and other controls well known to the art. As shown in FIG. 2A, the chamber designated generally 68 is provided with a circular conduit skirt 51 which, together with passage tube 54 connects vacuum pump 52 to the interior of chamber 68 and more specifically to the initial confined space designated **68*a* which contains a small orifice 9*c*. Vacuum pump 52 is such that it may provide an atmospheric pressure within space 68*a* from only slightly less than the ambient surrounding pressure to a high vacuum better than $10^{-4}$ torr. By means of a further circular conduit 51*a* and a further tube passageway 54*a*, a plurality of openings 50*a* within space 68*b* are connected to a further vacuum pump 52*a*. The latter pump 52*a* produces and maintains a vacuum in analyzer 64 and electron multiplier 40 at a proper operating pressure for these components, such vacuum being $10^{-5}$ torr or better. A second pump 52*b* is provided further to evacuate the analyzer 64 via a tube passageway 54*b***.

A screen 67 is affixed over the entrance of the small orifice **9*c* which serves essentially the same purpose as screen 57 in FIG. 1A. Particles 10 pass through orifices 9*c* and 9*d* to impinge on surface 15 whereby bursts of ions 20 are received and separated by analyzer 64, the filtered ions being registered as described with reference to FIG. 2**.

In the apparatus shown in both FIGS. 1A, and 3, measurement of the total material in an aerosol without regard to particulate size or size distribution may be made or such measurements may be made simultaneously. However, it is to be appreciated that the pulse time-length in surface ionization particulate detectors is typically on the order of 10 micro seconds. Thus, when the count rate from an aerosol exceeds about $10^4$ pulses per second, individual pulses begin to overlap and accuracy is lost. But with apparatus in accordance with the invention, even though the count rates exceed this figure for very dense aerosols, such as in smoking environments, the dc current continues to record the aerosol density. Further, calibration of the dc current relative to the count rate may be readily accomplished by diluting the gas containing the aerosol with a clean gas as from source 32 whereby the aerosol is diluted to a point where counts are accurately registered and, at the same time, the corresponding dc current may be noted. By this procedure, the dynamic range of the surface ionization particulate detector is extended several orders of magnitude.

By using pulse height discrimination in a pulse registration circuitry, only particulates having a size above a specified value are recorded as counts. The dc current, on the other hand, records contributions not only from such particles but also from particles smaller than those of sufficient size to provide a count. By then counting the dc current and the rate of pulse counts, one can discern whether a given aerosol consists of larger or smaller particles.

Figure 4:
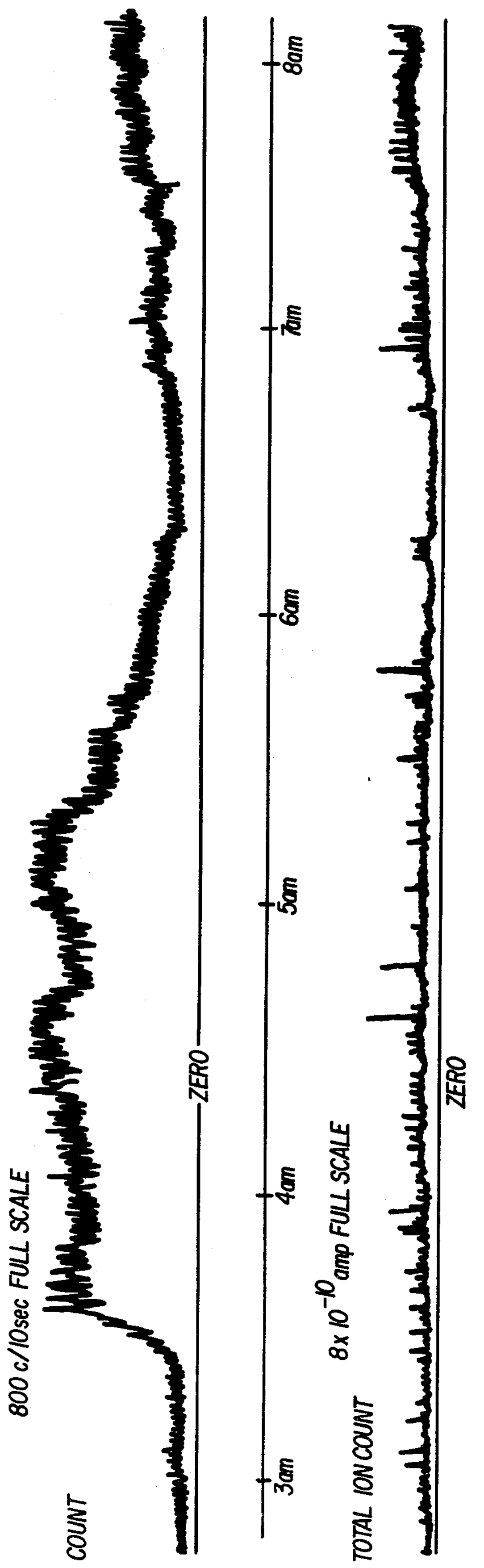
FIG. 4 is a diagram showing a night time outdoor air sampling of particulate matter by the invention.

FIG. 4 illustrates a use of the invention in recording the air in Pittsburgh, Pennsylvania, during an early morning in February. The pulse height discriminator level was set to register particulates with a size in excess of about 0.4 microns in diameter. It will be noted that a large excursion occurred about 3:30 a.m. in the count rate. This is probably due to the clearing of smoke stacks in the area. Although the count rate increased dramatically due to the presence of particulates with diameters greater than 0.4 microns, the dc current level increased only slightly, indicating that the aerosol during this period consisted primarily of larger particulates. Later, a second excursion commencing at about 7 a.m., probably due to traffic, shows both the count rate and the dc current increasing markedly. The relative increase in the dc current level as compared to the comparable increases in the count rate level indicates a second aerosol to be substantially richer in particulates of sizes less than 0.4 microns than the first aerosol.

Although we have described the preferred embodiments of our invention, it is to be understood that it is capable of other adaptations and modifications and that other circuitry to accomplish the processing and registration of both dc and pulse information will be readily apparent to those skilled in the electronic circuit arts. Thus, the appended claims should be construed to cover not only corresponding material as described in the specification but also the equivalents thereof.

Having thus described our invention, what we claim as new and desire to secure by Letters Patent of the United States is:

1. A method for detecting and measuring particulate matter which comprises the impinging of said particulate matter upon a hot surface whereupon said individual particulates of said particulate matter decompose at the high temperature of the heated surface into fragments, at least some of said fragments being surface ionizable by said hot surface evolving therefrom as bursts of ions, and discerning said bursts of ions so produced by the simultaneous counting of said bursts of ions and the measuring of total current produced thereby.

2. A method in accordance with claim 1 wherein electric fields are provided to attract said ions evolved from said hot surface to an electrode.

3. A method in accordance with claim 1 wherein electric fields are provided to attract said ions evolved from said hot surface to the first dynode of an electron multiplier.

4. A method in accordance with claim 1 wherein said particulates which produce bursts of ions which are counted each have a size greater than about 0.4 microns in diameter.

5. A method in accordance with claim 1 wherein said particulates which produce bursts of ions which are counted each have a mass in excess of $10^3$ amu.

6. A method in accordance with claim 5 wheren said particulates which produce bursts of ions which are counted each have a mass in the range of about $10^4$ to $10^8$ amu.

7. A method in accordance with claim 1 wherein a clean gas is used to dilute the gas containing the particulate matter.

8. An apparatus for the detection of particulate matter contained in air, the apparatus comprising a container including a small orifice therein receiving said particulate matter entrained in air, a heated surface in said container arranged so that particulate matter entering said container through said orifice impinges on said heated surface, said heated surface adapted to produce a burst of ions through surface-ionization upon the impingement and decomposition thereon of one of said particulates of said particulate matter, and means for receiving and registering the electric current produced by said bursts of ions on a continuing basis.

9. Apparatus in accordance with claim 8 wherein said heated surface is heated by an electric current passing therethrough.

10. Apparatus in accordance with claim 8 wherein said means for receiving and registering the electric current due to all said particulate matter also includes means for receiving and registering the electric charge produced by each burst of ions.

11. Apparatus in accordance with claim 10 wherein said means for registering the electric charge includes a pulse height discriminator adapted to discriminate pulses generated by ions of a said burst of ions.

12. Apparatus in accordance with claim 8 wherein a dc current meter is provided to measure said current.

13. Apparatus in accordance with claim 8 wherein an electron multiplier is provided between said heated surface and said means for receiving and registering said electric current whereby the current produced by bursts of ions is increased.

14. Apparatus in accordance with claim 8 which includes means for registering said bursts of ions individually simultaneously with the registration of said electric current.

15. Apparatus in accordance with claim 8 including means for diluting the gas containing said particulate matter with a clean gas.

16. Apparatus in accordance with claim 8 wherein the pressure in said container is in a range from substantially atmospheric pressure to $10^{-4}$ torr or less.

17. Apparatus in accordance with claim 8 wherein a blower is provided, said blower moving particulate matter entrained with air into said small orifice.

18. An apparatus for the detection of particulate matter contained in a gas, the apparatus comprising a container including a small orifice therein for receiving said particulate matter entrained in said gas, a heated surface in said container arranged so that the particulate matter entering said container through said orifice impinges on said heated surface, said heated surface adapted to produce a burst of ions through surface-ionization upon the impingement and decomposition thereon of one of said particulate matter, means for analyzing said ions in said burst on the basis of their mass-to-charge ratios, and means for receiving and registering substantially each pulse count and the electric current produced by each said burst of ions which have been analyzed on the basis of their mass-to-charge ratio on a continuing basis.

19. Apparatus in accordance with claim 18 wherein said means for analyzing said ions on the basis of their mass-to-charge ratio is a quadrupole mass spectrometer.

* * * * *